United States Patent
Joncour

(10) Patent No.: US 8,807,748 B2
(45) Date of Patent: *Aug. 19, 2014

(54) APPLIANCE FOR READING THE SHAPE OF A RIM OR A HALF-RIM OF AN EYEGLASS FRAME, AND A CORRESPONDING READING METHOD

(75) Inventor: Christian Joncour, Charenton le Pont (FR)

(73) Assignee: Essilor International (Compagnie Generale d'Optique), Charenton-le-Pont (FR)

(*) Notice: Subject to any disclaimer, the term of this patent is extended or adjusted under 35 U.S.C. 154(b) by 993 days.

This patent is subject to a terminal disclaimer.

(21) Appl. No.: 12/935,820

(22) PCT Filed: Mar. 23, 2009

(86) PCT No.: PCT/FR2009/000309
§ 371 (c)(1),
(2), (4) Date: Sep. 30, 2010

(87) PCT Pub. No.: WO2009/144396
PCT Pub. Date: Dec. 3, 2009

(65) Prior Publication Data
US 2011/0030520 A1    Feb. 10, 2011

(30) Foreign Application Priority Data
Apr. 14, 2008  (FR) ..................... 08 02041

(51) Int. Cl.
G02C 13/00 (2006.01)
G01B 5/20 (2006.01)

(52) U.S. Cl.
CPC ..................... G01B 5/20 (2013.01)
USPC ......................................... 351/178

(58) Field of Classification Search
USPC ................. 351/159.73–159.76, 178
See application file for complete search history.

(56) References Cited

U.S. PATENT DOCUMENTS

| 5,485,399 A | 1/1996 | Saigo et al. |
| 6,813,536 B1 | 11/2004 | Gottschald |
| 8,132,909 B2 * | 3/2012 | Divo et al. .................. 351/178 |
| 2009/0140036 A1 | 6/2009 | Haddadi |

FOREIGN PATENT DOCUMENTS

| DE | 19804542 A1 | 8/1999 |
| EP | 1854584 A2 | 11/2007 |
| FR | 2637830 A1 | 4/1990 |
| WO | 2007128902 A | 11/2007 |
| WO | 2008142291 A2 | 11/2008 |

OTHER PUBLICATIONS

International Search Report, dated Oct. 23, 2009, from corresponding PCT application.

* cited by examiner

Primary Examiner — James Greece
(74) Attorney, Agent, or Firm — Young & Thompson

(57) ABSTRACT

An appliance for reading a rim (110) or a half-rim of an eyeglass frame, includes holder elements for holding the eyeglass frame and a feeler (10) that is mounted to turn about an axis of rotation (A1) in order to follow a longitudinal profile (P1) of the rim or half-rim of the eyeglass frame held in the holder elements. The feeler is fitted with a reader head (12) including a V-shaped bearing shoe (15) that is open in a direction facing away from the axis of rotation and that is adapted to be engaged on the rim or half-rim in order to slide therealong.

12 Claims, 2 Drawing Sheets

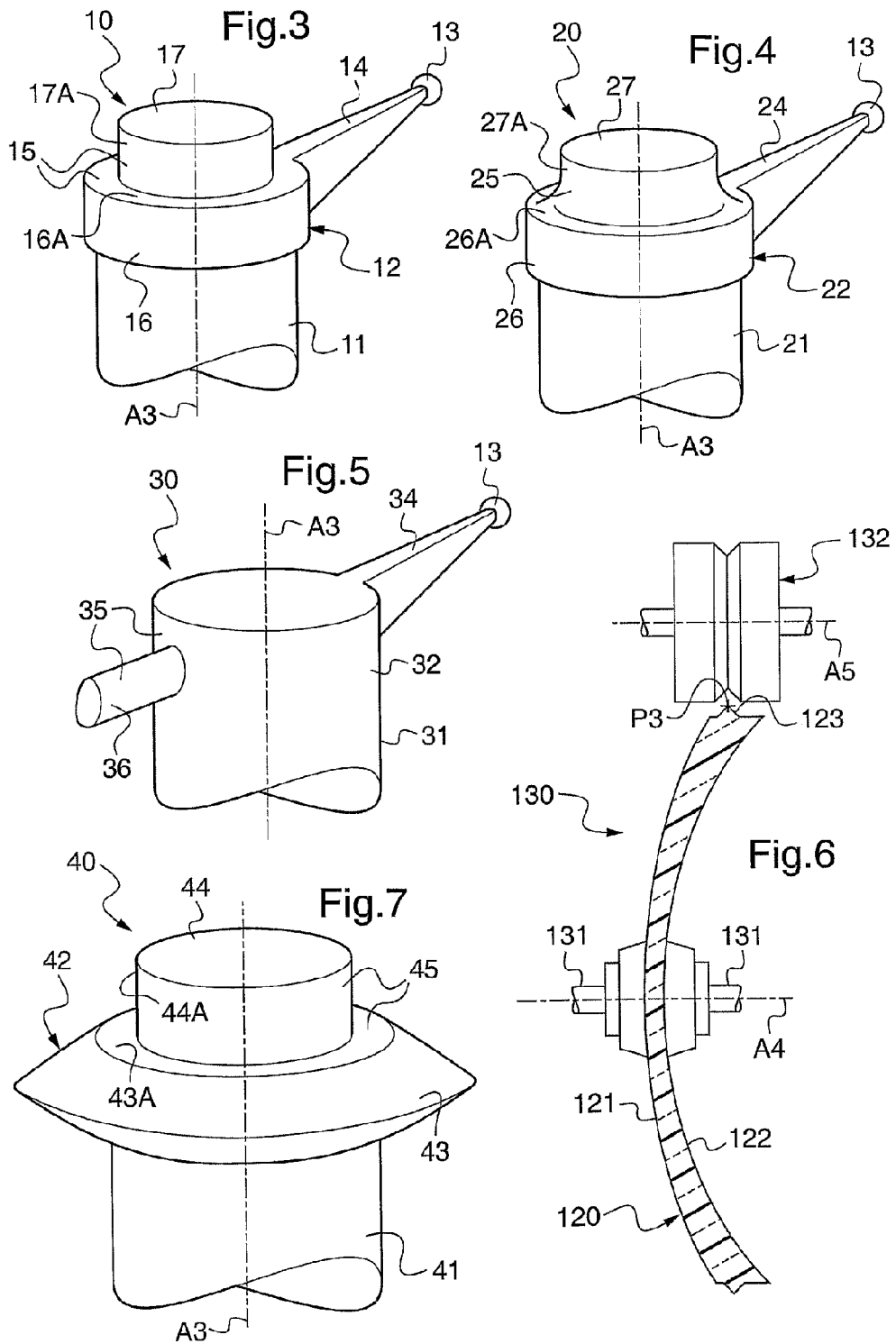

US 8,807,748 B2

APPLIANCE FOR READING THE SHAPE OF A RIM OR A HALF-RIM OF AN EYEGLASS FRAME, AND A CORRESPONDING READING METHOD

TECHNICAL FIELD TO WHICH THE INVENTION RELATES

The present invention relates in general to the field of eyeglass manufacture and more precisely to acquiring the shape of a rim or a half-rim respectively of a rimmed or half-rimmed eyeglass frame, for the purpose of machining an ophthalmic lens for mounting in the eyeglass frame.

More particularly, the invention relates to a reader appliance for reading a rim or a half-rim of an eyeglass frame, the appliance comprising: holder means for holding the eyeglass frame; and a feeler that is mounted to turn about an axis of rotation in order to follow a longitudinal profile of the rim or half-rim of the eyeglass frame held in the holder means.

The invention also relates to a method of preparing an ophthalmic lens for mounting in a rim or a half-rim eyeglass frame, the method comprising a step of feeling a first longitudinal profile running along an inside face of the rim or half-rim, and a step of shaping the ophthalmic lens so as to form an engagement ridge on its edge face, the engagement ridge having a longitudinal profile that is deduced from the first longitudinal profile.

TECHNOLOGICAL BACKGROUND

The technical portion of the work of an optician consists in mounting a pair of correcting ophthalmic lenses in an eyeglass frame selected by a wearer. Such mounting comprises three main operations:
  acquiring the shape of a rim or of a half-rim of the eyeglass frame;
  centering the lens, which consists in positioning and orienting the lens appropriately in front of the corresponding eye of the wearer; and then
  machining the lens, which consists in cutting or shaping its outline to the desired shape, given the shape of the rim or half-rim and given defined centering parameters.

The specific object of the optician is to shape the ophthalmic lens so that it fits mechanically and pleasingly in the shape of the rim or half-rim of the selected frame, while also ensuring that the lens performs as well as possible the optical function for which it is designed.

With rimmed eyeglass frames, shaping includes a beveling operation that consists in forming an engagement ridge along the edge face of the lens, which ridge is for engaging in a groove that runs around the inside face of the rim of the eyeglass frame.

With half-rimmed eyeglass frames, the shaping comprises a grooving operation that consists in forming an engagement groove along the edge face of the lens, part of the groove serving to be engaged on a ridge that runs along the inside face of the half-rim of the eyeglass frame. The lens is held in the half-rim by means of a string that is connected to the ends of the half-rim and that is received in the remaining portion of the engagement groove.

For reasons of appearance, it is generally desirable to place the ophthalmic lens in the rim or the half-rim of the eyeglass frame in such a manner that the front face of the lens is as close as possible to being flush with the front margin of the rim or the half-rim.

On these lines, it is known for example from document WO 2007/128902 to begin by feeling the bottom of the bezel of a rim of a rimmed eyeglass frame longitudinally in order to acquire the shape of the outline of the rim, and then to feel a section of the bezel transversely in order to acquire the distance between the bottom of the bezel and the front margin of the rim. During the beveling operation, the engagement ridge is then made so as to lie at a distance from the front face of the lens that is constant and equal to the acquired distance. Thus, once the ophthalmic lens is engaged in the rim, its front face is substantially flush with the front margin of the rim.

Nevertheless, that method presents accuracy that is not very satisfactory. A rim of an eyeglass frame generally presents a section that is of non-uniform shape (for example the rim may be slightly twisted), such that the distance between the bottom of the bezel and the front margin of the rim varies. Thus, when said distance is measured at only one cross-section of the rim, a lens that is obtained after machining that presents a front face that is generally flush with the front margin of the rim only in that section that was felt.

That same document also describes feeling a plurality of cross-sections of the rim of the eyeglass frame, thereby making it possible to acquire the distance between the bottom of the bezel and the front margin of the rim in a plurality of zones around the rim. Nevertheless, that method is awkward and time-consuming to implement.

OBJECT OF THE INVENTION

In order to remedy the above-mentioned drawback of the state of the art, the present invention proposes a novel reader appliance that is specially adapted to determining quickly and accurately the distance between the bezel of the rim or the ridge of the half-rim and the front margin of said rim or said half-rim.

More particularly, the invention provides a reader appliance of the type described in the introduction, having its feeler mounted firstly to turn about the axis of rotation in order to follow a longitudinal profile of the rim or the half-rim of the eyeglass frame held in the holder means, and also fitted with a reader head that includes a V-shaped bearing shoe that is open facing away from said axis of rotation.

The V-shaped bearing shoe is thus suitable for being engaged against the rim or the half-rim in order to slide therealong. It thus has two main bearing faces, one of which is adapted to come into contact with and slide along the inside face of the rim or the half-rim, while the other one is adapted to come into contact with and to slide along the front margin of the rim or the half-rim.

Thus, by means of the invention, the feeler can slide along the entire outline of the rim or along the entire length of the half-rim in order to measure the position of a longitudinal profile running along the front margin of the rim or the half-rim.

In rimmed frames, once the position of the bottom of the bezel and the position of said longitudinal profile are known, it is then easy to calculate the distance between the bottom of the bezel and the front margin of the rim at any point around the rim.

It is then possible to bevel the lens in such a manner that once it is engaged in the rim, its front face is substantially flush with the front margin of the rim.

In corresponding manner, with a half-rimmed frame, knowing the position of the top of the ridge and the position of the longitudinal profile running along the front margin of the half-rim, it is then easy to calculate the distance between the peak of the ridge and the front margin of the half-rim at any point along the half-rim.

It is then possible to groove the lens so that once it is engaged in the half-rim, its front face is substantially flush with the front margin of the half-rim.

So long as the feeler exerts a return force on the rim or the half-rim of magnitude and direction that are appropriate, while reading the shape of the second longitudinal profile, the V-shape of the bearing shoe serves to ensure that said bearing shoe remains engaged against the rim or the half-rim as it slides thereover, regardless of any variations in the shape of the rim or the half-rim.

The invention also provides a method of preparing an ophthalmic lens for mounting in a rim or a half-rim of an eyeglass frame, the rim or the half-rim presenting an inside face for facing towards the ophthalmic lens and a front margin for facing away from the face of the wearer of the eyeglass frame. According to the invention, the method includes a step of acquiring a first longitudinal profile running along the inside face of said rim or half-rim, a step of feeling a second longitudinal profile running along the front margin of said rim or said half-rim by means of a feeler fitted with a reader head having a V-shaped bearing shoe engaged against said rim or said half-rim in order to slide therealong, and a step of shaping the ophthalmic lens so as to form on its edge face an engagement ridge that extends along a deduced longitudinal profile of shape that is calculated as a function of said first and second longitudinal profiles.

More particularly, the shape of the deduced longitudinal profile is calculated so that at the end of the shaping step, the ophthalmic lens can be engaged in the rim or the half-rim in such a manner that the periphery of its front face is as close as possible to being flush with the front margin of the rim or the half-rim.

DETAILED DESCRIPTION OF AN EMBODIMENT

The following description with reference to the accompanying drawings and given by way of non-limiting example shows clearly what the invention consists in and how it can be reduced to practice.

In the accompanying drawings:

FIGS. 3 to 5 and 7 are perspective views of four variants of the FIG. 2 bearing shoe; and FIG. 6 is a diagrammatic view of a shaper appliance.

Figure 1:
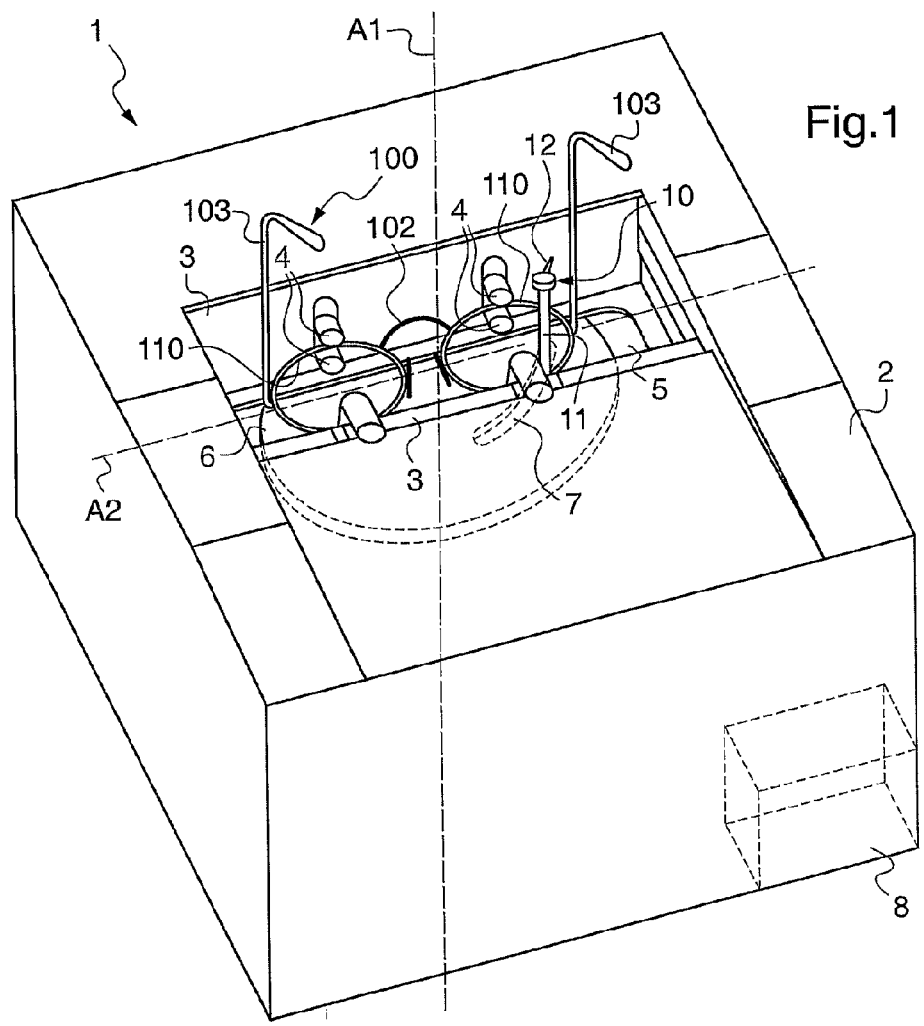
FIG. 1 is a perspective view of an outline reader appliance of the invention receiving a rimmed eyeglass frame provided with two rims.

An object of the present invention is to improve the appearance of the engagement of an ophthalmic lens in a rim or a half-rim respectively of a rimmed or half-rimmed eyeglass frame.

In the description below, attention is given more particularly to rimmed eyeglass frames 100 (FIG. 1) having two rims 110 that are connected together by a bridge 102, and each of which is fitted with a temple 103.

The rims 110, also referred to as surrounds, may present a variety of shapes (square, elongate, oval, . . . ). It should naturally be understood that the term "rim" is not in any way limiting as to the shape of the element concerned. [This clarification is given because, in the original French, the term for "rim" is "cercle", which also means "circle".] The term "rimmed frame" is used in contrast to the term "rimless frame" which is used for frames having a bridge and two temples, but no rims.

Relative to this rimmed eyeglass frame 100, it is possible to define a general plane (not shown) that is tangential to the bridge 102 of the eyeglass frame 100 and that is orthogonal to the two branches 103 of the frame when they are in the deployed position.

Each rim 110 presents an inside face 114 bordered by two margins 115, 116, comprising a rear margin 116 towards the same side of the rim as the temples 103, and an opposite, front margin 115. The front margin 115 is thus intended to face way from the face of the wearer of the eyeglass frame 100.

Figure 2:
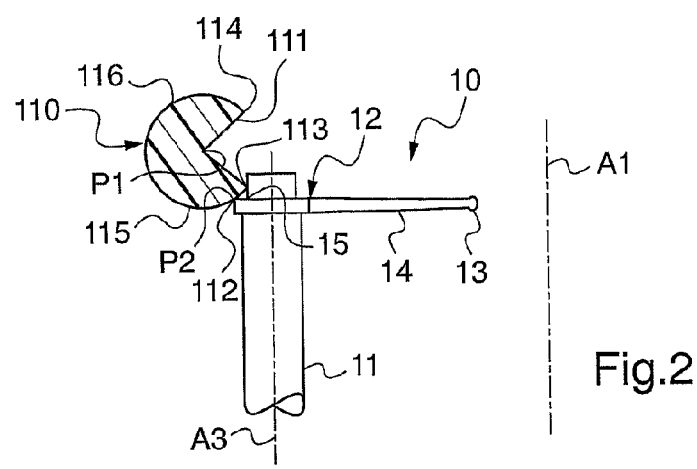
FIG. 2 is a section view of the feeler of the outline reader appliance of FIG. 1, fitted with a bearing shoe engaged on one of said rims.

Conventionally, and as shown in FIG. 2, the inside face 114 of each rim 110 has a generally profiled groove running therealong, generally presenting a dihedral angle and commonly referred to as a bezel 111.

The bezel 111 extends along a curvilinear longitudinal profile P1. This longitudinal profile P1 corresponds to one of the contours of the bezel, extending over one and/or the other of the flanks of the bezel and substantially parallel to or coinciding with the bottom of the bezel. Here it corresponds to the contour of the bezel that runs along the bottom of the bezel 111.

As shown in FIG. 6, the ophthalmic lens 120 for engaging in the corresponding rim 110 of the eyeglass frame presents a convex front optical face 121 and a concave rear optical face 122. As shown in this figure, the ophthalmic lens 120 has already been machined and on its edge face it includes an engagement ridge 123 for engaging in the bezel 111 of the rim 110.

This engagement ridge 123 extends in this example with a deduced longitudinal profile P3 that is curvilinear and presents a uniform V-shaped section. The deduced longitudinal profile P3 corresponds to a line running along the engagement ridge, i.e. a contour extending on one and/or the other of the flanks of said engagement ridge 123 and that is substantially parallel to or coincides with the peak of the engagement ridge.

As described in greater detail below, the shape of the deduced longitudinal profile P3 (as a function of which the ophthalmic lens is machined) is itself deduced from the shape of the longitudinal profile P1 of the bezel 111 of the rim 100 and from a longitudinal profile P2 of the front margin 115 of the rim 110.

This curvilinear longitudinal profile P2 corresponds to a contour that runs along the front margin 115 of the rim 110 and that extends substantially parallel to the bottom of the bezel 111, close to the inside face 114 of the rim 110.
Device In order to acquire these longitudinal profiles P1 and P2, an outline reader appliance 1 is used, such as that shown in FIG. 1, for example.

This appliance comprises a structure 5 that is covered by a top cover 2 and that receives the eyeglass frame 100.

The structure 5 includes means for holding the eyeglass frame 100, here constituted by two movable jaws 3 provided with pairs of studs 4 suitable for clamping onto the rims 110 of the eyeglass frame 100.

The outline reader appliance 1 also has a feeler 10 provided with a support rod 11 of longitudinal axis A3 and a reader head 12 adapted to follow the longitudinal profiles P1, P2 of the rim 110 of the eyeglass frame 100 by making contact therewith, while turning about an axis of rotation A1.

For this purpose, the feeler 10 has four freedoms of movement relative to the structure 5, thereby enabling it to follow the two longitudinal profiles P1 and P2.

A particular architecture for the reader appliance is described below that imparts the various freedoms of movement to the feeler, however this architecture applies to merely one possible embodiment amongst others of the reader appliance.

The outline reader appliance 1 described has a plate (not visible) that is suitable for moving in translation on the structure 5 along a transfer axis A2. A turntable 6 is mounted on the plate. The turntable 6 is thus suitable for taking up two positions along the transfer axis A2, each position being in register with a respective one of the two rims 110 of the eyeglass frame 100.

The turntable 6 possesses an axis of rotation A1 defined as the axis normal to the front face of the turntable 6 and passing through its center. The turntable is adapted to pivot about this axis relative to the plate. The turntable 6 also has a circularly-arcuate oblong slot 7 through which the feeler 10 projects.

The outline reader appliance 1 also includes actuator means for moving the plate along the transfer axis A2, for causing the turntable 6 to turn about its axis of rotation 1, for causing the support rod 11 of the feeler 10 to slide along the slot 7, to modify the height of the feeler head 12 relative to the plane of the turntable 6, and finally to cause the support rod 11 of the feeler 10 to pivot about its longitudinal axis A3.

Finally, the outline reader appliance 1 includes an electronic and/or computer device 8 serving firstly to control the actuator means of the outline reader appliance 1, and secondly to acquire and store successive positions of the reader head 12 of the feeler 10.

As shown in FIGS. 2 and 3, the feeler 10 is fitted with a reader head 12 comprising firstly a feeler finger 14 and secondly a V-shaped bearing shoe 15 that is open in a direction facing away from said axis of rotation A1 and that is adapted to be engaged on said rim 110 in order to slide therealong.

The feeler finger described presents the form of a pointer 14 that extends perpendicularly to the longitudinal axis A3 of the support rod 11 and that presents a spherical endpiece 13. The endpiece 13 is for inserting in the bottom of the bezel 111 of the rim 110 and for being slide along the bezel 111 so as to read the shape of the longitudinal profile P1 of the bezel 111.

In a variant, this feeler finger could equally well be in some other form. For example, it could be in the form of a cylindrical rod or blade pointing along a direction orthogonal to the longitudinal axis A3 of the support rod 11.

The bearing shoe 15 is situated on the reader head 12, opposite from the feeler finger 14.

It presents two bearing portions for bearing respectively against a portion 113 of the inside face 114 of the rim 110 and a portion 112 of the front margin 115 of the rim 110. In a section plane containing the longitudinal axis A3 and the axis of rotation A1, these two bearing portions together form a V-shape with the bisector thereof being inclined relative to the longitudinal axis A3 at an angle lying in the range 40 degrees to 50 degrees.

One of these bearing portions extends radially relative to the axis of rotation A1 so as to be substantially orthogonal to said axis of rotation A1. The other one of these bearing portions extends axially relative to the axis of rotation A1 so as to be substantially parallel to said axis of rotation A1.

More precisely, in the embodiment of the feeler 10 shown in FIGS. 2 and 3, the reader head 12 has a collar 16 that is mounted at the end of the support rod 11 and that is surmounted by a peg 17.

The collar 16 may be a separate piece, e.g. fitted by screw fastening, or it may be formed integrally with the support rod 11.

The collar 16 is circularly cylindrical about the longitudinal axis A3, and of diameter that is greater than the diameter of the support rod 11. The peg 17 is likewise circularly cylindrical about the longitudinal axis A3, but it presents a diameter that is strictly less than the diameter of the collar 16. The peg 17 thus forms a constriction of section relative to the collar 16, thereby defining a shoulder around the entire periphery of the collar 16.

The feeler finger 14 extends from the cylindrical side face of the collar 16.

The V-shaped bearing shoe 15 is formed by the collar 16 and by the peg 17. More precisely, this bearing shoe 15 has two bearing faces 16A and 17A that are formed by the plane top face of the collar 16 and by the cylindrical side face of the peg 17.

The difference in diameter between the collar 16 and the peg 17 preferably lies in the range 4 millimeters to 10 millimeters. Consequently, the bearing shoe 15 presents a first edge 16A of a length that is less than 5 millimeters, i.e. the edge formed by the top plane face of the collar 16 (extending substantially orthogonally to said axis of rotation A1 and thus substantially parallel to the general plane of said rim).

Because of its shape, as shown in FIG. 2, the V-shaped bearing shoe 15 is adapted to be engaged on the rim 110 so that its first edge 16A can slide along the longitudinal profile P2 of the front margin 115 of the rim.

In addition, since the length of this first edge 16A is short, it is certain that the longitudinal profile P2 that is felt extends close to the inside face 114 of the rim, i.e. close to the open mouth of the bezel 111. Thus, regardless of the shape of the rim 110, the longitudinal profile felt on the front margin 115 of the rim lies close to the place where the front face of the lens is to be flush once the lens has been machined and engaged in the rim 110.

In another embodiment of the feeler 20 shown in FIG. 4, the peg 27 of the reader head 22 presents a side face that is not cylindrical. In this embodiment, the support rod 21 and also the collar 26 and the feeler finger 24 of the reader head 22 present shapes that are identical to those described above. However the peg 27 presents a shape in the form of a body of revolution about the longitudinal axis A3 having a generator line that is curved towards the longitudinal axis A3 of the support rod 21. In other words, the peg 27 presents the shape of a hyperboloid having its base coinciding with the top face of the collar 26 and having its top presenting a smaller diameter.

The V-shaped bearing shoe 25 is then formed entirely by the side face of the peg 27.

By virtue of its shape, this V-shaped bearing shoe 25 is adapted to be engaged on the rim 110 in such a manner that a first portion 16A of its side face (situated close to its base) can slide along the longitudinal profile P2 of the front margin 115 of the rim, while another portion 17A of its side face (situated close to its top) can slide along the inside face 114 of the rim.

In another embodiment of the feeler 30 shown in FIG. 5, its reader head 32 is formed by the free end of the support rod 31, by the feeler finger 34 that extends from the cylindrical side face of said free end, and by a spur 36 that projects from the cylindrical side face of this free end, opposite from the feeler finger 34.

In this embodiment the spur 36 is in the form of a circular cylinder about an axis perpendicular to the longitudinal axis A3 of the support rod 31.

The V-shaped bearing shoe 35 is then formed by the cylindrical side face of the free end of the support rod 31 and by the spur 36.

Thus, by virtue of its shape, the V-shaped bearing shoe 35 is adapted to be engaged on the rim 110 in such a manner as to enable the spur 36 to slide along the longitudinal profile P3 of the front margin 115 of the rim 110 with the cylindrical side face of the free end of the support rod 31 then being able to slide along the inside face 114 of the rim 110.

Whatever the shape of the reader head 12; 22; 32, the bearing shoe 15; 25; 35 must be positioned facing the rim 110 in order to be engaged thereon. The reader head 12; 22; 32 must therefore present freedom to pivot so as to make it possible to select either the feeler finger 14; 24; 34 for feeling the longitudinal profile P1 or the bearing shoe 15; 25; 35 for feeling the longitudinal profile P2.

Thus, while feeling the longitudinal profile P2, the reader head 12 is controlled so that the feeler finger 14 points towards the inside, i.e. towards the axis of rotation A1.

In the example shown in FIG. 1, this freedom of movement is obtained by the freedom of the support rod 11 to pivot about its longitudinal axis A3.

In a variant, provision could be made for the outline reader appliance 1 to lack this freedom to move in pivoting. Provision can then be made for the reader head to be manually removable so as to enable it to be mounted on the support rod in two different orientations. Provision could also be made for two interchangeable reader heads, one carrying the feeler finger while the other carries the bearing shoe.

In another variant, in order to simplify the algorithms for controlling the feeler 10, provision could also be made to feel the longitudinal contour P2 of the front margin 115 of the rim 110 without causing the reader head to pivot about the longitudinal axis, but rather by using as the bearing shoe the shoulder that is formed by the peg 17 and by the feeler finger 14.

In this variant, while feeling the longitudinal profile P2, the feeler finger 14 faces outwards, in the same manner as while acquiring the shape of the bezel 111.

In another embodiment of the outline reader appliance, provision may be made for the feeler to have three freedoms to move in translation so as to be able to move in all three dimensions of space. Such an outline reader appliance is described, for example, in document EP 0 291 378 and in document U.S. Pat. No. 4,995,170. It includes means for actuating the feeler in three mutually orthogonal directions.

In this embodiment, as shown in FIG. 7, provision can be made for the reader head 42 of the feeler 40 to be formed by a disk 43 surmounted by a peg 44 and fastened to the free end of the support rod 41.

The disk 43 in this embodiment is made up of two superposed truncated cones, with their vertices facing away from each other. The disk 43 is in the form of a body of revolution about the longitudinal axis A3 and has a maximum diameter that is greater than the diameter of the support rod 41. The peg 44 is a circular cylinder about the longitudinal axis A3 and it presents a diameter that is strictly less than the minimum diameter of the disk 43. The peg 44 thus forms a constriction of section relative to the disk 43 and thus defines a shoulder around the entire periphery of the reader head 42.

The V-shaped bearing shoe 45 is formed by this shoulder. More precisely, it has two bearing faces 43A and 44A that are formed by the cylindrical side face of the peg 44 and by the plane top face of a truncated end of the disk 43.

By virtue of its circularly symmetrical shape, the disk 43 may be engaged in the bezel 111 of the surround 110 to slide along the longitudinal profile P1 in order to acquire its shape, while conserving a constant orientation about its longitudinal axis A3.

To feel the entire bezel 111 of the rim 110, the feeler 40 follows a path corresponding to the longitudinal profile P1. The axis that is parallel to the longitudinal axis A3 and that passes through the center of gravity of the first longitudinal profile P1 can then be considered as being an axis of rotation of the feeler. This axis of rotation is not embodied as a mechanical member of the outline reader appliance, but rather is an abstract geometrical axis.

The V-shaped bearing shoe 45 is thus adapted to be engaged with the rim 110 in such a manner that its first edge 43A can slide along the front margin 115 of the rim 110 so as to read the shape of the longitudinal profile P2.

In order to prepare the ophthalmic lens 120, it is also known to make use of a shaper appliance 130 that does not form part of the subject matter of the present invention. Such a shaper appliance is well known to the person skilled in the art and is described, for example, in document U.S. Pat. No. 6,327,790 or sold by the Applicant under the trademark Kappa CTD.

As shown in FIG. 6, such a shaper appliance 130 comprises support means, here constituted by shafts 131, for holding and driving the ophthalmic lens 120 in rotation about a blocking axis A4. Such a shaper appliance also includes shaper means, formed in this example by a machining tool 132 mounted to rotate about a machining axis A5 that in this example is substantially parallel to the blocking axis A4, but that could equally well be inclined relative thereto.

The machining tool 132 and/or the shafts 131 are provided with two freedoms of relative movement, including freedom to move radially that enables the spacing between the machining axis A5 and the blocking axis A4 to be modified, and freedom to move in axial translation along an axis parallel to the blocking axis A4.

The shaper appliance 130 also has an electronic and/or computer device (not shown) that is provided firstly with means for communicating with the electronic and/or computer device 8 of the outline reader appliance 1, and secondly with means for controlling the freedoms of movement of the shafts 131 and of the machining tool 132. In particular, the electronic and/or computer device serves for each angular position of the lens 120 of the blocking axis A4 to control the radial spacing between the machining tool 132 and the blocking axis A4, and also the axial position of the edge face of the lens relative to the working surface of the machining tool 132.

As shown more particularly in FIG. 6, the machining tool 132 is constitutes specifically by a main form grindwheel, i.e. a grindwheel presenting a recessed machining profile that is complementary, like a negative, to the section of the engagement ridge 123 that is to be obtained projecting from the edge face of the lens for machining.

Method of Preparation

The method of preparing the ophthalmic lens is described below with reference to the outline reader appliance 1 shown in FIGS. 1 to 3.

The method comprises four main steps. In particular, it includes an acquisition step of acquiring the shape of the longitudinal profile P1 of the bezel 111, an acquisition step of acquiring the longitudinal profile P2 of the front margin 115 of the rim 110, a deduction step of deducing the shape of the deduced longitudinal profile P3 of the engagement ridge 123 as a function of the shapes of the longitudinal profiles P1 and P2, and a shaping step of shaping the ophthalmic lens 120 to have the deduced longitudinal profile P3.

During the first step, the eyeglass frame 10 selected by a future wearer is engaged in the reader appliance 1 (FIG. 1). To do this, the frame 100 is inserted between the studs 4 of the jaws 3.

The feeler, which is initially positioned in the center of the turntable 6 and below the eyeglass frame 100, is then actuated to take up a position between the two studs 4 of a jaw 3 in contact with the bezel 111, so as to be capable of feeling the corresponding rim 110 of the eyeglass frame 100.

Contact between the feeler finger 14 and the bottom of the bezel 111 is conserved by the actuator means exerting a radial return force on the feeler 10 that is directed towards the bezel 111. This radial return force thus serves to avoid the feeler finger 14 from moving along one or the other of the flanks of the bezel 111 and to avoid it escaping therefrom.

The electronic and/or computer device 8 then controls the means for actuating the turntable 6 so that the feeler finger 14 of the feeler 10 moves continuously along the bottom of the bezel 111, while remaining in contact with the bottom of the bezel 111 as a result of said radial return force.

During the rotation of the turntable 6, the electronic and/or computer device 8 reads the three-dimensional coordinates of a plurality of points on the longitudinal profile P1 of the bezel 111, e.g. 360 points, in order to store an accurate digital model of the profile.

At the end of this step, the feeler 10 is controlled to return to its initial position in the center of the turntable 6, below the eyeglass frame 100.

During the second step, the electronic and/or computer device 8 causes the support rod 11 to pivot about its longitudinal axis A3 so that the reader head 12 performs an about-turn.

Thereafter, the electronic and/or computer device 8 controls the actuator means of the turntable 6 and of the support rod 11 in combination so that the support rod 11 occupies the center of the rim 110, i.e. the center of the previously-felt longitudinal profile P1. More precisely, the support rod is positioned in such a manner that the top face of the peg 17 of its reader head 12 is situated 1 millimeter below the first-felt point of the longitudinal profile P1 of the bezel 111.

Thereafter, the turntable 6 and the support rod are actuated so that the reader head 12 of the feeler 10 moves in a plane parallel to the top face of the turntable 6 towards the first-felt point of the longitudinal profile P1 of the bezel 111, until the cylindrical side face of the peg 17 of the reader head 12 comes into contact with the inside face 114 of the rim 111. This contact may optionally be detected by a sensor provided for this purpose in the actuator means. The actuator means are then caused to stop.

Thereafter, the electronic and/or computer device 8 controls the actuator means of the feeler 10 so that the feeler rises relative to the plane of the turntable 6 until the top face 16A of the collar 16 comes into contact with the front margin 115 of the rim.

In this position that is shown in FIG. 2, the bearing shoe 15 is properly engaged with the rim 110, since it makes contact with two distinct points 112 and 113 of the rim.

The actuator means are then controlled to exert an oblique return force on the feeler 10 that is directed along the angular bisector of the V-shape of the bearing shoe 15 so as to maintain contact of the bearing shoe 15 against the inside face 114 and the front margin 115 of the rim 110.

The turntable 6 is then controlled to perform one complete revolution around its axis of rotation A1 so that the bearing shoe 15 slides along all of the rim 110.

During the rotation of the turntable 6, the electronic and/or computer device 8 measures the three-dimensional coordinates of a plurality of points of the longitudinal profile P2 of the front margin 115 of the rim, e.g. 360 points. In a variant, provision may be made for the electronic and/or computer device 8 to measure only the difference in height (along the axis of rotation A1) between the two longitudinal profiles P1 and P2.

During this complete revolution, provision may be made for the feeler 10 to be actuated so as to bypass the studs 4 in such a manner that the reader head 12 does not come into contact therewith. The longitudinal profile P2 will then present two zones that are not felt. The coordinates of the points of the longitudinal profile P2 that are not felt may then be calculated by interpolation, as a function of the coordinates of points of said profile that are felt.

This interpolation calculation may optionally be refined if the studs 4 are provided with sensors that make it possible to determine their positions relative to the structure 5. One of these studs 4 is in contact with the front margin 115 of the rim 110, thus making it possible to determine the height of the front margin 115 along the axis of rotation A1.

At the end of this second step, provision may be made to store the three-dimensional coordinates of the felt points of the longitudinal profile P2 in a registry of a database that is accessible to the optician or in a registry of a shared database that is accessible to a plurality of opticians working in locations that are far apart.

Under such circumstances, the database registry preferably includes a plurality of records each associated with a reference type of eyeglass frame, i.e. generally with an eyeglass frame model. Each record contains a reference for the eyeglass frame type, together with shape data relating to a longitudinal profile running along the front margin of one of the rims of frames of said type. In practice, the reference will be constituted by the name of the eyeglass frame model, while the shape data will be constituted by a string of characters representing the three-dimensional coordinates of 360 points of the corresponding longitudinal profile.

Prior to storing the three-dimensional coordinates of the felt points of the longitudinal profile P2 in the registry, provision is made to search amongst the existing records for the reference of the frame in order to verify whether there already exists a record corresponding to said frame. Thereafter, if no record is found, the optician creates a new record with a reference of the frame together with a string of characters including the three-dimensional coordinates of the 360 points of the longitudinal profile P2.

During the third step, the electronic and/or computer device 8 proceeds to calculate the shape of the deduced longitudinal profile P3. This shape thus enables a shaping set-point to be determined for use by the shaper appliance 130 when shaping the ophthalmic lens 120.

The three-dimensional coordinates of the 360 points of the deduced longitudinal profile P3 are calculated in this example as a function of the three-dimensional coordinates of the 360 points of the two longitudinal profiles P1 and P2.

More precisely, the radial and angular coordinates relative to the axis of rotation A1 of the 360 points of the deduced longitudinal profile P3 are calculated as a function of the radial and angular coordinates of the 360 points of the longitudinal profile P1 of the bezel 11.

More precisely, they are calculated so that the projections of the longitudinal profiles P1 and P3 onto a plane orthogonal to the axis of rotation A1 coincide or are geometrically similar.

The scale ratio is calculated as a function of the shapes of the cross-sections of the bezel 111 and of the beveling groove of the machining tool 132. This scale ratio makes it possible to take account of the fact that once the lens is engaged in the rim, the peak of the engagement ridge (corresponding to the deduced longitudinal profile P3) never comes into contact with the bottom of the bezel (corresponding to the longitudinal profile P1), but is set back a little therefrom.

The axial coordinates along the axis of rotation A1 of the 360 points of the deduced longitudinal profile P3 are calculated as a function of the axial coordinates of the 360 points of the longitudinal profiles P1 and P2 of the bezel 111 and of the front margin 115 of the rim.

Specifically, the axial coordinates of the 360 points of the deduced longitudinal profile P3 are calculated so that the front face 121 of the ophthalmic lens 120 is flush with the front margin 115 of the rim 110 at a number N of cross-sections of the rim 110. It can be understood that given the differences of shape between the bezel 111 and the outline of the front face 121 of the ophthalmic lens, it is not possible for the front face 121 of the lens to be flush with the front margin 115 of the rim over its entire outline.

This number N can be set by the user. In a variant, provision may be made for it to be calculated automatically so as to have a maximum value. In another variant, it may be calculated so that the mean of the differences between the outline of the front face 121 of the lens and the front margin 115 of the rim is minimized.

The outline of the front face of the ophthalmic lens 120 is said to be flush with the front margin 115 of the rim 110 in a given section when, in said section, the point of the outline of the front face 121 of the lens and the point of the longitudinal profile P2 (situated on the front margin 115) are both at the same level along the axis of rotation A1.

Finally, during a fourth and last step, the shaper appliance 130 proceeds to shape the ophthalmic lens 120.

The shafts 131 of the lens support and/or the shaper tool 132 are controlled for this purpose as a function of the shape of the deduced longitudinal profile P3 so as to form on the edge face of the lens 120 the engagement ridge 123 having said profile.

By means of the invention, the peak of the engagement ridge 123 as obtained in this way lies at a distance from the front face 121 of the ophthalmic lens 120 that varies in a manner substantially identical to the manner in which the difference between the front margin 115 and the bottom of the bezel 111 varies around the rim 110.

This ensures that once the ophthalmic lens 120 is engaged in the rim 110, its front face is as flush as possible with the front margin 115 of the rim 110.

The present invention is not limited in any way to the embodiments described and shown, and the person skilled in the art may apply any variant in accordance with its spirit.

In particular, the invention finds an advantageous application when it is implemented by clients (opticians) who subcontract fabrication and shaping of lenses to contractors.

More precisely, we consider firstly a client terminal installed in a client's premises for ordering lenses, and secondly a contractor terminal installed on the premises of a lens manufacturer for fabricating and shaping lenses.

The client terminal has computer means for storing and transmitting order data concerning the ophthalmic lens 120, e.g. communicating by means of Internet protocol (IP). The order data comprises prescription data for correcting vision (e.g. optical power data, centering data, . . . ) and data relating to the frame.

The contractor terminal includes computer means for receiving and storing order data transmitted by the client terminal. It also includes a device for fabricating the ophthalmic lens in compliance with the prescription data, e.g. comprising means for molding the lens and/or for machining at least one of the optical faces of the lens.

It also includes a device for shaping the ophthalmic lens in accordance with the data relating to the frame. The shaper device is designed in particular to implement the fourth step of the above-described method.

The method of preparing lenses is likewise performed in four steps.

During a first step, the client feels the eyeglass frame selected by the client in accordance with the first two steps of the method described above. Shape data concerning the two felt longitudinal profiles P1 and P2 is deduced therefrom. By way of example, the shape data may be made up of a string of characters comprising the three-dimensional coordinates of 720 points making up the two felt longitudinal profiles P1 and P2.

Thereafter, during a second step, the client uses the client terminal to send lens order data. This data comprises the optical prescriptions for the wearer together with said shape data.

During a third step, the contractor receives the order data and proceeds to mold the lens and/or to machine at least one of its optical faces. In order to calculate the shapes of the two optical faces of the lens, the contractor takes account not only of the prescription data for vision correction, but also of the shape data so that the periphery of the front face of the lens comes as close as possible to being flush with the front margin of the frame.

Finally, during a fourth step, the contractor calculates the shape of the deduced longitudinal profile P3 as a function of said shape data. Thereafter the ophthalmic lens 120 is shaped as a function of the received shape data so as to have the deduced longitudinal profile P3.

The description above refers to rimmed eyeglass frames. Nevertheless, the method described is equally applicable to half-rimmed eyeglass frames.

Such eyeglass frames have half-rims, also known as half-surrounds, that are connected together by a bridge and each of which has a temple. Each half-rim presents an inside face along which there runs an engagement ridge lying between a rear margin that is to be directed towards the face of the wearer of the eyeglass frame and an opposite, front margin.

The longitudinal profile that extends along the front margin of each half-rim may then be felt using one or other of the feelers described above, the V-shaped bearing shoe of the feeler being adapted to engage the half-rim, beneath the engagement ridge.

The invention claimed is:

1. A reader appliance (1) for reading a rim (110) or a half-rim of an eyeglass frame (100), the appliance comprising:
   holder means (3, 4) for holding the eyeglass frame (100); and
   a feeler (10; 20; 30) that is mounted to turn about an axis of rotation (A1) in order to follow a longitudinal profile (P1) of the rim (110) or half-rim of the eyeglass frame (100) held in the holder means (3, 4);
   the reader appliance being characterized in that the feeler (10; 20; 30) is fitted with a reader head (12; 22; 32) including a V-shaped bearing shoe (15; 25; 35) that is open in a direction facing away from said axis of rotation (A1).

2. A reader appliance according to claim 1, including control means (8) for controlling said feeler (10; 20; 30), the control means being adapted to urge the bearing shoe (15; 25; 35) of said feeler (10; 20; 30) into contact with two distinct zones (112, 113) of the rim (110) or half-rim of the eyeglass frame (100) held in the holder means (3, 4).

3. A reader appliance according to claim 1, wherein the bearing shoe (15; 25; 35) of said feeler (10; 20; 30) presents an edge (16A; 26A; 36A) that is substantially orthogonal to said axis of rotation (A1), and that presents a length of less than 5 millimeters.

4. A reader appliance (1) for reading a rim (110) or a half-rim of an eyeglass frame (100), the appliance comprising:

holder means (3, 4) for holding the eyeglass frame (100); and a feeler (10; 20; 30) adapted to follow a longitudinal profile (P1) of the rim (110) or the half-rim of the eyeglass frame (100) held in the holder means (3, 4);

the reader appliance being characterized in that the feeler (10; 20; 30) is fitted with a reader head (12; 22; 32) including a V-shaped bearing shoe (15; 25; 35) adapted to be engaged with the rim (110) or the half-rim in order to slide therealong.

5. A reader appliance according to claim 4, wherein the bearing shoe (15; 25; 35) of said feeler (10; 20; 30) presents a margin (16A; 26A; 36A) that is substantially parallel to the general plane of the eyeglass frame (100) and that presents a length that is less than 5 millimeters.

6. A preparation method of preparing an ophthalmic lens (120) for mounting in a rim (110) or a half-rim of an eyeglass frame (100), the rim (110) or half-rim presenting an inside face (114) for being directed towards the ophthalmic lens (120) and a front margin (115) for being directed away from the face of the wearer of the eyeglass frame (100), the method comprising:

an acquisition step of acquiring a first longitudinal profile (P1) running along the inside face (114) of said rim (110) or half-rim; and a shaping step of shaping the ophthalmic lens (120) with an engagement ridge (123) being formed on its edge face and extending in accordance with a deduced longitudinal profile (P3) of a shape that is calculated as a function of said first longitudinal profile (P1);

the preparation method being characterized in that it includes a feeling step of feeling a second longitudinal profile (P2) running along the front margin (115) of said rim (110) or half-rim, by means of a feeler (10; 20; 30) fitted with a reader head (12; 22; 32) including a V-shaped bearing shoe (15; 25; 35) that is engaged on said rim (110) or half-rim to slide therealong; and in that the deduced longitudinal profile (P3) is also calculated as a function of the second longitudinal profile (P2).

7. A preparation method according to claim 6, wherein the shape of the deduced longitudinal profile (P3) is calculated so that, at the end of the shaping step, the ophthalmic lens (120) is suitable for being engaged in the rim (110) or half-rim, in such a manner that the periphery of its front face (121) is flush with the front margin (115) of the rim (110) or half-rim.

8. A preparation method according to claim 6, including a searching step of searching in a database registry in which each record is associated with a reference type of eyeglass frame and contains shape data for a second longitudinal profile specific to said reference type of eyeglass frame for a record corresponding to said eyeglass frame (100), and if no corresponding record is found, a writing step of writing a new record associated with said eyeglass frame (100) and containing shape data deduced from the second felt longitudinal profile (P2).

9. A method according to claim 6, implemented by a system comprising both a client terminal installed on the premises of a client and including computer means for storing and transmitting ophthalmic lens order data (120), said order data including data relating to said eyeglass frame (100), and also a contractor terminal installed on the premises of a contractor, and including computer means for receiving and storing order data transmitted by the client terminal and a shaper device for shaping said ophthalmic lens (120) and designed to implement said shaping step, the method comprising:

a step of preparing shape data deduced from the second felt longitudinal profile (P2); and a step of the client terminal sending and of the contractor terminal receiving order data, said data including said shape data.

10. A reader appliance according to claim 2, wherein the bearing shoe (15; 25; 35) of said feeler (10; 20; 30) presents an edge (16A; 26A; 36A) that is substantially orthogonal to said axis of rotation (A1), and that presents a length of less than 5 millimeters.

11. A preparation method according to claim 7, including a searching step of searching in a database registry in which each record is associated with a reference type of eyeglass frame and contains shape data for a second longitudinal profile specific to said reference type of eyeglass frame for a record corresponding to said eyeglass frame (100), and if no corresponding record is found, a writing step of writing a new record associated with said eyeglass frame (100) and containing shape data deduced from the second felt longitudinal profile (P2).

12. A method according to claim 7, implemented by a system comprising both a client terminal installed on the premises of a client and including computer means for storing and transmitting ophthalmic lens order data (120), said order data including data relating to said eyeglass frame (100), and also a contractor terminal installed on the premises of a contractor, and including computer means for receiving and storing order data transmitted by the client terminal and a shaper device for shaping said ophthalmic lens (120) and designed to implement said shaping step, the method comprising:

a step of preparing shape data deduced from the second felt longitudinal profile (P2); and a step of the client terminal sending and of the contractor terminal receiving order data, said data including said shape data.

* * * * *

UNITED STATES PATENT AND TRADEMARK OFFICE
CERTIFICATE OF CORRECTION

| | | |
|---|---|---|
| PATENT NO. | : 8,807,748 B2 | Page 1 of 1 |
| APPLICATION NO. | : 12/935820 | |
| DATED | : August 19, 2014 | |
| INVENTOR(S) | : Christian Joncour | |

It is certified that error appears in the above-identified patent and that said Letters Patent is hereby corrected as shown below:

Title Page, after Abstract, 12 Claims should be 13 Claims

In the Claims

Column 14, line 51, add claim 13 as follows:

-- 13. A method according to claim 8, implemented by a system comprising both a client terminal installed on the premises of a client and including computer means for storing and transmitting ophthalmic lens order data (120), said order data including data relating to said eyeglass frame (100), and also a contractor terminal installed on the premises of a contractor, and including computer means for receiving and storing order data transmitted by the client terminal and a shaper device for shaping said ophthalmic lens (120) and designed to implement said shaping step, the method comprising:

- a step of preparing shape data deduced from the second felt longitudinal profile (P2); and

- a step of the client terminal sending and of the contractor terminal receiving order data, said data including said shape data. --

Signed and Sealed this
Twenty-fourth Day of February, 2015

Michelle K. Lee
*Deputy Director of the United States Patent and Trademark Office*